United States Patent
Vrana (10) Patent No.: US 7,237,996 B2
(45) Date of Patent: Jul. 3, 2007

(54) NUT FEED SYSTEM AND NUT

(75) Inventor: John J. Vrana, Rochester Hills, MI (US)

(73) Assignee: Fabristeel Products, Inc., Taylor, MI (US)

( * ) Notice: Subject to any disclaimer, the term of this patent is extended or adjusted under 35 U.S.C. 154(b) by 238 days.

(21) Appl. No.: 10/847,795

(22) Filed: May 18, 2004

(65) Prior Publication Data

US 2005/0258185 A1 Nov. 24, 2005

(51) Int. Cl.
*F16B 37/04* (2006.01)

(52) U.S. Cl. .................. 411/180; 411/442; 206/345

(58) Field of Classification Search ................ 411/427, 411/179, 180, 181, 442, 443; 206/343, 345, 206/346
See application file for complete search history.

(56) References Cited

U.S. PATENT DOCUMENTS

| | | | | |
|---|---|---|---|---|
| 1,627,207 A | * | 5/1927 | Sharp | 411/427 |
| 2,096,335 A | * | 10/1937 | Nicholas | 411/180 |
| 3,042,068 A | * | 7/1962 | Smith | 137/315.05 |
| 3,108,368 A | | 10/1963 | Steward | |
| 3,117,610 A | * | 1/1964 | Matthews | 411/84 |
| 3,140,010 A | | 7/1964 | Double | |
| 3,187,424 A | * | 6/1965 | Double et al. | 29/432 |
| 3,711,931 A | | 1/1973 | Ladouceur et al. | |
| 3,942,235 A | | 3/1976 | Goodsmith et al. | |
| 3,987,830 A | * | 10/1976 | Ladouceur | 411/179 |
| 4,124,050 A | * | 11/1978 | Ackerman | 411/179 |
| 4,170,918 A | * | 10/1979 | Burge | 411/427 |
| 4,560,061 A | * | 12/1985 | Haytayan | 206/3 |
| 4,653,970 A | * | 3/1987 | Ballantyne | 411/555 |
| 4,971,499 A | * | 11/1990 | Ladouceur | 411/179 |
| 5,446,957 A | * | 9/1995 | Wu | 29/424 |
| 5,769,584 A | * | 6/1998 | Claes | 411/427 |
| 6,631,827 B2 | | 10/2003 | Goodsmith et al. | |
| 6,702,536 B2 | * | 3/2004 | Nilsen | 411/171 |
| 6,986,629 B2 | * | 1/2006 | Babej et al. | 411/180 |
| 2005/0013679 A1 | * | 1/2005 | Ladoucer et al. | 411/180 |

FOREIGN PATENT DOCUMENTS

WO  WO 03/016727 A2  2/2003

* cited by examiner

*Primary Examiner*—Flemming Saether
(74) *Attorney, Agent, or Firm*—Howard & Howard Attorneys, P.C.

(57) ABSTRACT

A nut feed system and method of feeding nuts through a nut feed passage which avoids contact between the feed pawl and the nut bore. The end face of the nut includes a nut feed groove extending perpendicular to the nut bore and the free end of the feed pawl is received in the groove to drive the nuts through a nut feed passage without contacting the bore. The disclosed embodiment of the nut includes a counterbore through the end face and radial channel-shaped feed grooves and the feed pawl includes a cylindrical center portion and radial portions received in the counterbore and feed grooves.

18 Claims, 4 Drawing Sheets

NUT FEED SYSTEM AND NUT

FIELD OF THE INVENTION

This invention relates to a nut feed system, including a method of feeding nuts, a nut feed pawl and a nut configured to receive a nut feed pawl for feeding nuts through a nut feed passage without contacting the nut bore, thereby avoiding damage of the nut bore during feeding.

BACKGROUND OF THE INVENTION

Nuts are typically fed through a nut feed passage by reciprocating a nut feed pawl having a finger received in the nut bore. The nut feed pawl is typically pivotally mounted on a feed mechanism, wherein the nut feed pawl is biased by a spring, pneumatic or hydraulic pressure or a positive linkage to reciprocate through the nut feed passage. The nut bore may be threaded or unthreaded to receive a thread forming or thread rolling male fastener, such as a bolt or screw. Nuts are fed through a nut feed passage for various purposes including, but not limited to, secondary operations, such as interconnecting the nuts in a strip, and installation. However, the nut feed pawl may deform or damage the nut bore during feeding of the nuts through a nut feed passage making it difficult or impossible to thread a male fastener into the nut bore. For example, the nuts may be jammed or cocked in the nut feed passage and the force of the finger of the nut feed pawl in the thread cylinder may be sufficient to damage a threaded nut bore or an unthreaded nut bore.

This is a particular problem with self-attaching nuts, including pierce, clinch and weld nuts, wherein the nut is permanently attached to a metal panel because the entire nut and panel assembly may have to be scrapped if the nut bore cylinder is damaged. In many applications, such as automotive applications, several self-attaching nuts are simultaneously attached to a panel, such as a bracket, frame or vehicle body component and the male fasteners are typically threaded into the nuts with a torque wrench. Thus, if the thread cylinder (threaded or unthreaded) of one of the nuts is damaged or distorted, a male fastener may crossthread in the nut bore or it may not be possible to thread the male fastener into the nut bore, requiring scrapping or retrofitting the entire assembly. As used herein, the term "nut" includes any female fastener having a threaded or unthreaded bore. Thus, there has been a long felt need for a method of feeding nuts through a feed passage using a feed pawl which does not engage the nut bore, eliminating damage or distortion of the nut bore.

Various attempts have been made by the Applicant and others to eliminate damage to the nut bore or thread cylinder through feeding of nuts through a nut feed passage, including providing notches in the side faces of the nut and feeding the nuts with two feed pawls or ratchets on opposed sides of the nuts which feed the nuts to a fastener installation head or for secondary operations, such as interconnecting the nuts in a strip, as disclosed for example in PCT Application WO 03/016727 A2 filed Jul. 31, 2002 and assigned to the assignee of this application. However, such methods of feeding nuts require additional space, particularly for fastener installation heads where additional space is not available and such methods are not always reliable because the use of two feed pawls or ratchets must be balanced to avoid cocking of the nuts during feeding. Further, such methods require complex feed mechanisms and substantial modification of the fastener and the feed mechanism. It would thus be desirable to feed nuts through a feed passage without contacting the nut bore, but with minimal modification of the feed pawl and the nut. The method of feeding nuts, nut feed pawl and nut configuration of this invention solves the problem of nut bore distortion or damage during feeding with minimal modification of the feed pawl and nut.

SUMMARY OF THE INVENTION

As set forth above, nuts or female fasteners are typically fed through a nut feed passage for various applications including, for example, installation of a self-attaching fastener in a panel as disclosed herein and in U.S. Pat. No. 6,631,827 assigned to the assignee of this application and U.S. Pat. Nos. 3,942,235 and 3,108,368, both assigned to the assignee of the predecessor in interest of the assignee of this application. This application and the above-referenced U.S. patents disclose a method of feeding pierce and clinch nuts in bulk or strip form through a nut feed passage of a pierce or clinch nut installation head. Although the method of feeding nuts through a nut feed passage, nut feed pawl and nut of this invention is particularly suitable for feeding self-attaching fasteners, including weld, clinch and pierce nuts, this invention is not limited to self-attaching fasteners and may be utilized to feed nuts through a nut feed passage for other applications, including secondary operations, such as tapping the nut bore and interconnecting the nuts in a continuous strip as disclosed, for example, in U.S. Pat. No. 3,711,931, assigned to the predecessor in interest of the assignee of this application. As set forth above, nuts are presently fed through a nut feed passage by a reciprocating nut feed pawl which is pivotally supported in the nut feed passage having a distal end portion including a finger which is received in the nut bore and the feed pawl is reciprocated through the nut feed passage to drive the nuts through the nut feed passage. The nut feed pawl may be spring biased as disclosed in the above-referenced U.S. Pat. Nos. 6,631,827 and 3,108,368, the feed pawl may be interconnected to a linkage as disclosed in the above-referenced U.S. Pat. No. 3,942,235, or the feed pawl may be biased by other means including pneumatic or hydraulic pressure. However, the nuts may encounter resistance to feeding the nuts through the nut feed passage, resulting in sufficient force applied to the nut bore or thread cylinder by the finger of the nut feed pawl to cause distortion or damage to the nut bore or thread cylinder, such that a male fastener will not thread into the nut bore. Further, the distortion or damage to the nut bore may not be discovered until after the nut is delivered to the customer. This is a particular problem where the nut is a self-attaching nut, such as a weld, clinch or pierce nut, where the nut is permanently installed to a panel and the defect in the nut bore or thread cylinder may not be discovered until after installation. The method of feeding nuts, feed pawl and nut configuration of this invention eliminates this problem by avoiding contact between the nut feed pawl and the nut bore, but requires no modification of the nut feed pawl, except for the distal end of the feed pawl and the end face of the nut as now described.

The nut of this invention includes a body portion having an end face and a bore through the body portion through the end face which may be threaded or unthreaded as described above. That is, the general configuration of the nut may be conventional including conventional polygonal nuts and particularly including self-attaching nuts, such as pierce, clinch and weld nuts as described above. Where the nut is a weld nut, the end face referred to herein is preferably the back face opposite the weld face, which typically includes weld projections or tips. Where the nut is a pierce or clinch nut, the end face is preferably the back face of the nut opposite the pilot portion as described further below.

The end face of the nut of this invention further includes a nut feed groove extending perpendicular to the nut bore, preferably on opposed sides of the bore adapted to receive a nut feed pawl for feeding the nuts through a feed passage without engaging the bore. In a preferred embodiment, the nut feed groove extends through the axis of the nut bore, thereby defining feed grooves on opposed sides of the nut bore, each having an open inner end opening into the nut bore. In one preferred embodiment, the nut feed grooves are channel-shaped, each having a bottom wall and opposed side walls which receive the distal end of the nut feed pawl as described below. In a preferred embodiment, the side walls of the channel-shaped nut feed grooves extend generally perpendicular to the end face of the nut. In one preferred embodiment of the nut of this invention, the nut bore further includes a counterbore through the end face coaxially aligned with the nut bore having a diameter greater than the nut bore which receives a central distal free end of the nut feed pawl as described below, although the nut feed groove may be utilized to feed the nuts through a nut feed passage without the counterbore. In one preferred embodiment, the counterbore is cylindrical to receive a generally cylindrical central end portion of the nut feed pawl as now described.

As will be understood from the above description, the nut feed pawl of this invention may be generally conventional except for the shape of the free distal end. As described above, the nut feed pawl may be pivotally supported in the nut feed passage and biased to feed nuts through the nut feed passage by a spring, pneumatic or hydraulic pressure or interconnected to the feed mechanism by a linkage. In a preferred embodiment, wherein the end face of the nut includes channel-shaped nut feed grooves on opposed sides of the bore, as described above, the end portion of the feed pawl includes generally rectangular end portion or portions, preferably having a width less than the width of the channel-shaped grooves measured between the opposed side walls. Where the bore of the nut includes a counterbore as described above, the free distal end of the feed pawl further includes a central semicircular portion having an outer diameter generally equal to the inner diameter of the counterbore which is received in the counterbore. In a preferred embodiment, the central portion of the free end of the feed pawl is cylindrical having an arcuate end chamfer to assure proper seating of the free end of the feed pawl in the counterbore in the end face of the nut during each reciprocal movement of the feed pawl.

Thus, a preferred embodiment of the nut feed pawl includes a central cylindrical end portion configured to be received in the counterbore and radial portions extending radially from a circumference of the central cylindrical portion, wherein the radial portions preferably have a width less than a width of the channel-shaped nut feed grooves which engage the opposed side wall of the nut feed grooves. In a preferred embodiment of the nut feed pawl, the generally cylindrical surface defines an arc of less than 180 degrees, preferably less than 150 degrees, to facilitate receipt of the cylindrical end of the nut feed pawl in the cylindrical counterbore and the nut feed grooves and prevent binding during repeated reciprocal movement of the nut feed pawl through the nut feed passage. As will be understood, the design of the nut and the nut feed pawl of this invention provides a balanced force against the nut during feeding of the nut through the nut feed passage, preventing cocking and assuring accurate feeding of the nuts through the nut feed passage without contacting the nut bore, thereby preventing distortion or damage to the nut bore while assuring feeding of the nuts through the nut passage. Further, if a nut becomes jammed in the nut passage, no damage is done to the nut bore.

As set forth above, this invention may also be utilized for feeding nuts for secondary operations, such as tapping the bore or interconnecting the nuts in a continuous strip as disclosed in the above-referenced U.S. Pat. No. 3,711,931. In one preferred embodiment, the nut feed grooves are coaxially aligned with the nut bore and extend from the nut bore a distance less than the width of the end face of the nut. The method of this invention may then include forming linear wire grooves in the end face of the nuts on opposed sides of the radial nut feed grooves, preferably extending perpendicular to the nut feed grooves and locating frangible wires in the linear wire grooves interconnecting the nuts in a continuous strip. As will be understood, the method of feeding nuts through a nut passage of this invention will then include receiving the free distal end of the nut feed pawl in the nut feed grooves of one of the nuts and feeding a plurality of interconnected nuts through the nut passage.

The method of feeding nuts through a nut feed passage thus includes forming a nut feed groove in the end face of the nut extending generally perpendicular to an axis of the nut bore, preferably on opposed sides of the bore, forming a nut feed pawl located in the nut feed passage having an end portion configured to be received in the nut feed groove and reciprocating the nut feed pawl to feed a nut through the nut feed passage. Where the nut bore further includes a counterbore, as described above, the method of this invention includes forming and receiving a semicircular central portion at the free end of the reciprocable nut feed pawl in the counterbore and reciprocating the nut feed pawl through the nut feed passage as described above. As will now be understood, the nut feed system of this invention including the method, feed pawl and nut of this invention assures accurate feeding of nuts through the nut feed passage, avoiding jamming of the nuts in the feed passage and contact between the feed pawl and the nut bore, thereby avoiding distortion or damage of the nut bore by avoiding contact of the nut bore with the feed pawl. The nut feed grooves and counterbore in the end face of the nut may be formed during manufacture of the nut without any substantial increase in cost and the nut feed pawl may replace a conventional feed pawl without substantial modification of the feed mechanism or installation head. The method of feeding nuts through a nut feed passage of this invention further balances the force of the reciprocating nut feed pawl against the nut, particularly where the nut feed grooves are located on opposed sides of the nut bore in the end face of the nut and thus avoids cocking of the nuts in the nut passage.

Other advantages and meritorious features of this invention will be more fully understood from the following description of the preferred embodiments, the appended claims and the drawings, a brief description of which follows. As will be understood, however, the embodiment of the nut feed system and method of this invention described below and shown in the drawings is exemplary only and does not limit the invention except as set forth in the appended claims.

DESCRIPTION OF THE PREFERRED EMBODIMENTS

Figure 1:
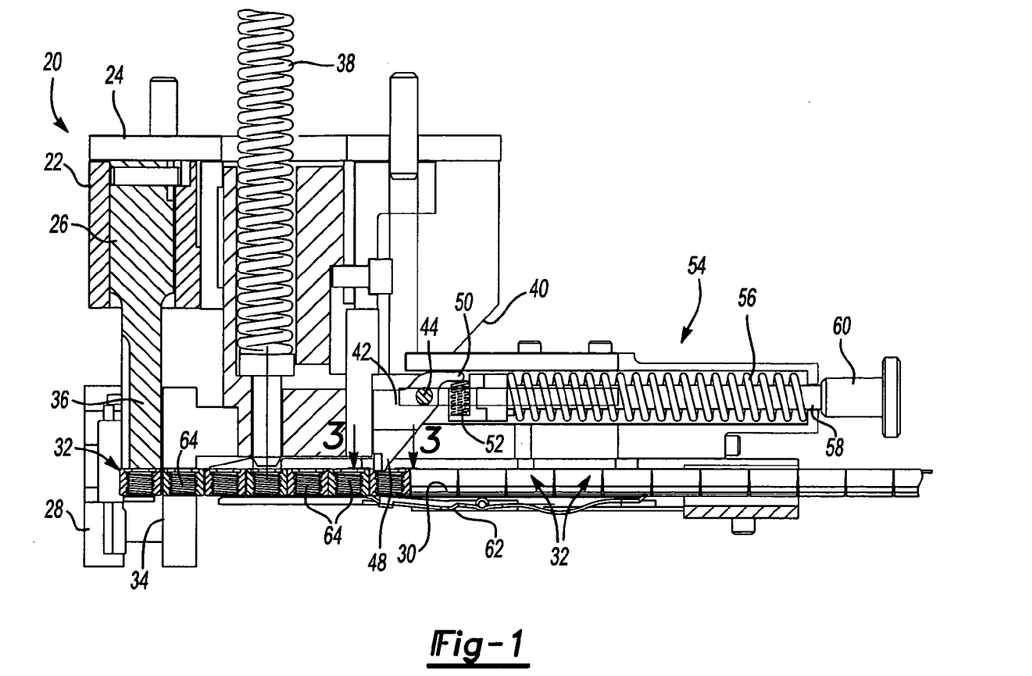
FIG. 1 is a side partially cross-sectioned view of a conventional pierce or clinch nut head having the improved nut feed pawl and nut configuration of this invention.

FIG. 1 illustrates a generally conventional pierce or clinch nut installation head 20. As will be understood by those skilled in this art and described further in the above-referenced U.S. patents, a pierce or clinch nut installation head is typically installed in the upper die shoe or platen of a die press (not shown), such that a pierce or clinch nut is installed in a panel with each stroke of the die press. The disclosed embodiment of the pierce or clinch nut installation head 20 includes a base member 22, which is conventionally attached to the upper die shoe or platen of a die press (not shown) having a mounting block 24 and a plunger 26 fixed relative to the base member 22. The installation head 20 further includes a nose member assembly 28 having a nut feed passage 30 receiving pierce or clinch nuts 32 and a plunger passage 34 which receives the free end 36 of the plunger 26. The installation head 20 further includes a large coil spring 38 which normally biases the nose member 28 away from the base member 22 when the die press (not shown) is opened. The base member 22 further includes an inclined cam surface 40 which receives a roller (not shown) rotatably supported on the nose member assembly 28 which forms part of the feed mechanism described below. The feed mechanism includes a nut feed pawl 42 having an aperture 46 (see FIG. 2) which receives a pivot pin 44 pivotally supporting the nut feed pawl 42 on the feed mechanism in the nut feed passage 30. The nut feed pawl 42 includes a free distal end 46 which engages and feeds the pierce or clinch nuts 32 through the nut feed passage 30 with each stroke of the die press (not shown) as described below. The disclosed embodiment of the nut feed pawl 42 further includes a proximal finger 50 which is biased upwardly by a small return coil spring 52 rotating the nut feed pawl 42 in a counterclockwise direction. The feed mechanism 54 further includes a coil spring 56 surrounding an adjustment rod 58 having an adjustment knob 60.

Thus, upon closing of the die press (not shown), the nose member 28 engages a panel (not shown) located in the die press, driving the nose member 28 upwardly in FIG. 1 to drive the free end 36 of the plunger 26 through the plunger passage 34, thereby installing a pierce or clinch nut 32 in a panel opposite the plunger passage 34 (not shown). As the nose member 28 is driven upwardly, the roller (not shown) engages the inclined cam surface 40, driving the feed mechanism 54 to the right in FIG. 1. Upon opening of the die press (not shown), the coil spring 38 drives the nose member 28 away from the base member 22 and the coil spring 56 of the feed mechanism 54 then drives the nut feed pawl 42 to the left in FIG. 1, driving a pierce or clinch nut 32 in the feed passage 30 into the plunger passage 34 and the installation head 20 is then ready for repeating the cycle, such that a pierce or clinch nut 32 is installed in a panel (not shown) opposite the plunger passage 34 with each stroke of the die press.

As described above, the free distal end 48 of a conventional pierce or clinch nut installation head normally includes a finger (not shown) which is received in the nut bore 64 as disclosed in the above-referenced patents. Thus, the finger at the free end 48 of the nut feed pawl 42 is driven against the nut bore 64 by the coil spring 56 with each stroke of the die press. However, the nuts 32 may become cocked or jammed in the nut feed passage 30 and the force of the finger in the nut bore may be sufficient to damage the thread cylinder making it difficult or impossible to thread a male fastener (not shown) into the bore 64. As used herein, the term "thread cylinder" refers to the cylindrical configuration of the nut bore 64, whether or not the bore is threaded or unthreaded. Thus, a primary object of this invention is to feed the nuts 32 through the nut feed passage 30 without contacting the thread cylinder 64.

Figure 6:
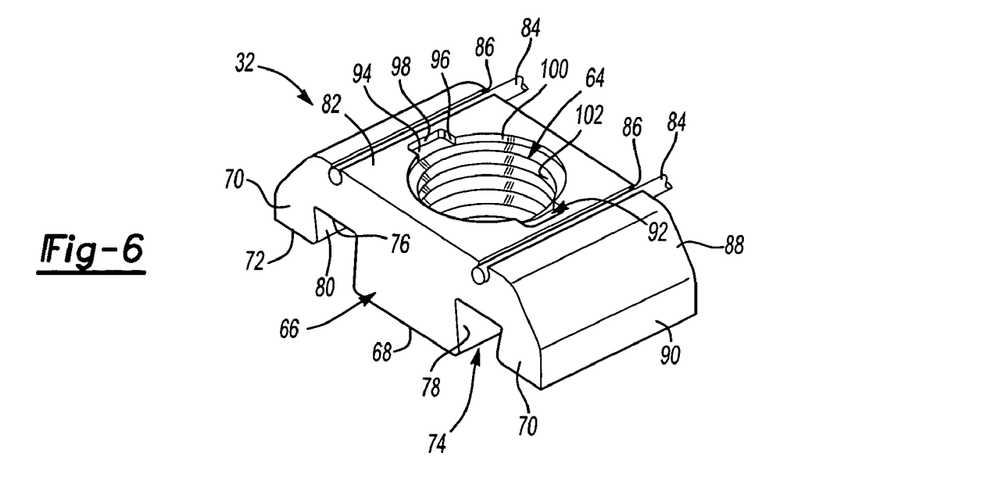
FIG. 6 is an end perspective view of a nut of this invention which includes frangible wires for interconnecting the nuts in a strip as shown in FIG. 2.
Figures 7, 8:
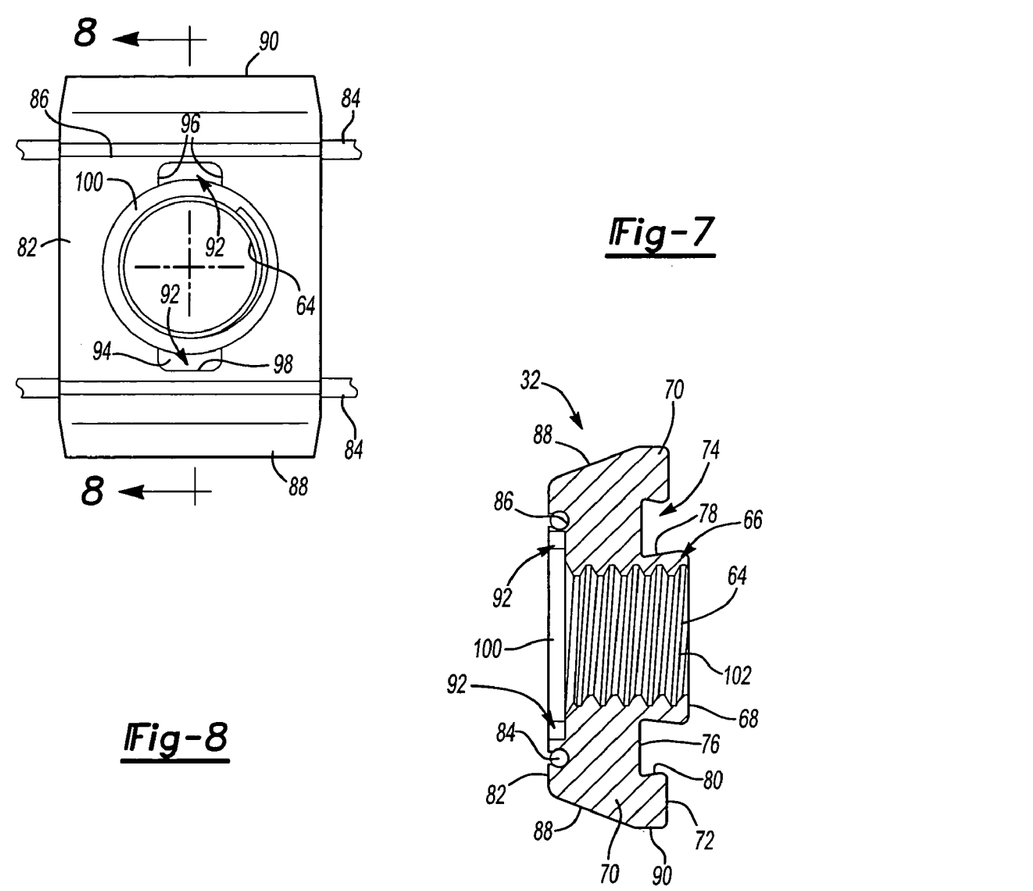
FIG. 7 is an end view of the nut shown in FIG. 7.
FIG. 8 is a side cross-sectional view of the nut shown in FIG. 7 in the direction of view arrows 8—8.

The disclosed embodiment of the nut 32 is a generally conventional pierce or clinch nut including a pilot portion 66 having a planar face 68, flange portions 70 on opposed sides of the pilot portion 66, each having a panel support face 72 and re-entrant grooves 74 in the panel support faces 72. The re-entrant grooves 74 each include a bottom wall 76, an inner side wall 78 inclined from the bottom wall 76 outwardly and an outer side wall 80 inclined inwardly toward the pilot portion 66 as best shown in FIGS. 6 and 8. As will be understood by those skilled in this art, the plunger 26 shown in FIG. 1 drives the planar end face 68 of the pilot portion 66 against a panel (not shown) opposite the plunger passage 34 to pierce an opening in the panel and a die button (not shown) then clinches the panel adjacent the pierced panel opening into the re-entrant grooves 74 permanently attaching the nut 32 to a panel. Alternatively, the panel may be pre-pierced and clinched to the panel by the die button. Thus, the nut 32 may be utilized as either a pierce or clinch nut. However, the configuration of the nut 32 as thus far described is conventional.

The nut 32 further includes a back or end face 82 which is typically planar and the nut bore 64 extends through the end face 82 and the piercing face 68 of the pilot portion 66 as best shown in FIG. 8. As disclosed in the above-referenced U.S. Pat. No. 3,711,931, the nuts 32 may be interconnected in a continuous strip by frangible wires 84. Linear wire grooves 86 may be rolled into the end face 82 of the nut during the roll forming process and the wires 84 are then received in the wire grooves 86 and the end face 84 is then either clinched or knurled to permanently retain the frangible wires 84 in the grooves 86. The frangible wires 84 may be formed of any suitable material including annealed carbon steel wire, which is preferably not heat treated, monofilament nylon strand, cord, cable or the like. As disclosed in U.S. Pat. No. 3,711,931, the continuous strip of pierce or clinch nuts may be fed from a coil to the installation head 20. Alternatively, as disclosed in the above-referenced U.S. Pat. No. 3,108,368 and U.S. Pat. No. 3,140,010 assigned to the predecessor in interest of the assignee of this application, the nuts may be fed in bulk form to the installation head 20 through plastic chuting. The back or end face of the disclosed embodiment of the pierce nut 32 further includes inclined faces 88 on opposed sides of the end face 82 and faces 90 perpendicular to the end face 82. The linear wire grooves 86 are preferably located in the planar end face 82 adjacent to but spaced from the inclined faces 88. As disclosed in the above-referenced U.S. Pat. No. 3,711,931, the pierce or clinch nut 32 may also be T-shaped, wherein the linear wire grooves 86 are formed in the planar end face. However, as set forth above, the configuration of the nut 32 may also be a weld nut or any conventional nut.

The nuts 32 of the nut feed system of this invention includes a nut feed groove 92 in the end face 82 which receives the free distal end 48 of the reciprocating nut feed pawl 42 without contacting the nut bore 64. In a preferred embodiment, the nut feed groove 92 extends through an axis of the nut bore 64 to define nut feed grooves 92 on opposed sides of the nut bore 64, each having an open end opening into the nut bore 64 as best shown in FIGS. 6 and 7. In a preferred embodiment, the nut feed groove or grooves 92 are channel-shaped, each having a bottom wall 94 and opposed side walls 96 which, in a preferred embodiment, extend generally perpendicular to the end face 82. In a preferred embodiment, the bottom wall 94 of the channel-shaped groove 92 is planar and parallel to the end face 82, such that the opposed side walls 96 are also perpendicular to the bottom wall 94. The channel-shaped groove 92 also includes end walls 98 which are preferably located within the end face 82 or spaced from the inclined surface 88 at the end face. In the disclosed embodiment, wherein the end face 82 of the pierce or clinch nuts 32 include linear wire grooves 86 for interconnecting the nuts in a continuous strip as described above, the end walls 98 are also preferably spaced from the linear wire grooves 86 and thus the linear wire grooves 86 are spaced on opposed sides of the nut feed groove 92 and extend perpendicular to the nut feed groove 92 and the side walls 96. As described below, the free distal end 48 of the nut feed pawl 42 is specifically configured to be received within the nut feed groove or grooves 92.

Figure 5:
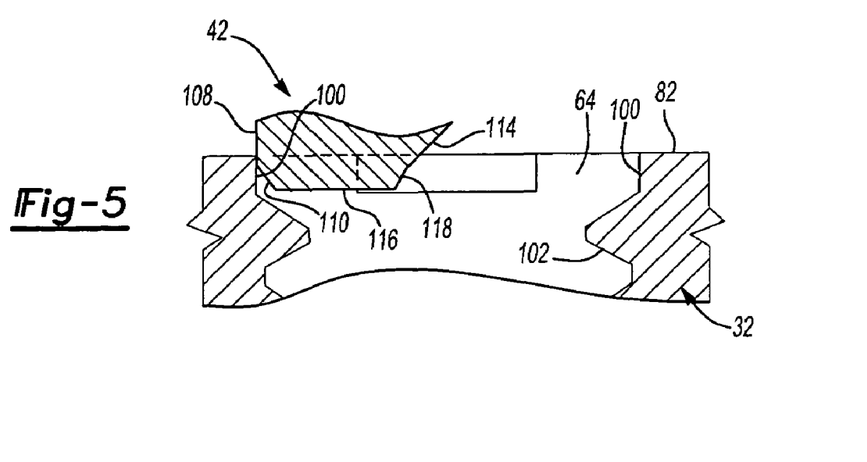
FIG. 5 is a partial end cross-sectional view of FIG. 3 in the direction of view arrows 5—5.

In a preferred embodiment of the nut feed system of this invention, the end face 82 of the nut 32 also includes a counterbore 100 coaxially aligned with the bore 64 having a diameter greater than the nut bore 64 to receive a central generally semicircular portion at the free distal end 48 of the nut feed pawl 42 as described below. In a preferred embodiment, the counterbore 100 is cylindrical having a smooth cylindrical surface. Where the nut bore 64 is internally threaded as shown in the drawings, the diameter of the cylindrical counterbore 100 is greater than the root or major diameter of the internal threads 102 as best shown in FIG. 5. As will be understood by those skilled in this art, the nut feed groove or grooves 92 and the counterbore 100 may be formed during piercing of the bore 64 without any substantial increase in cost. As now described, the distal free end 48 of the nut feed pawl 42 is configured to be received in the nut feed groove 92 without contacting the nut bore 64, thereby avoiding damage to the nut bore 64 during feeding of the nuts 32 through the nut feed passage 30.

Figures 9, 10:
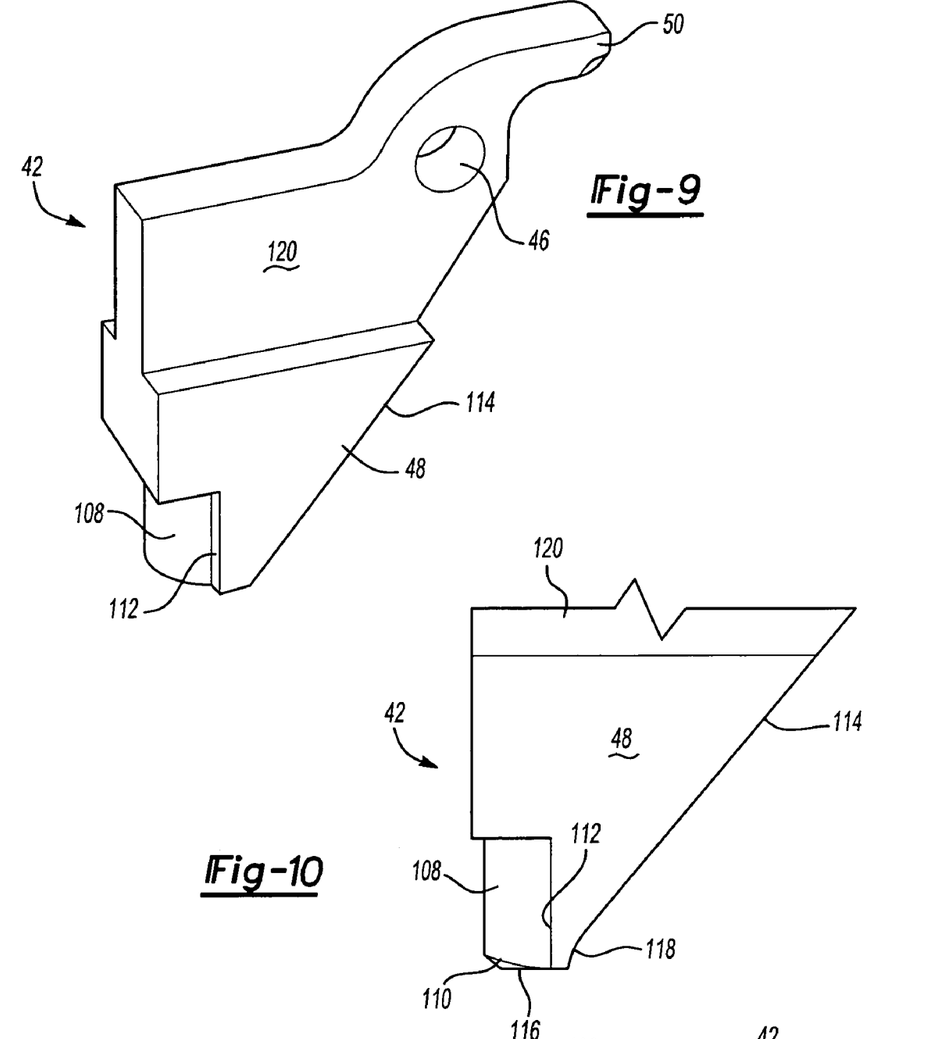
FIG. 9 is a side perspective view of the nut feed pawl shown in FIG. 2.
FIG. 10 is a partial side view of the nut feed pawl shown in FIGS. 2 and 9.
Figure 11:
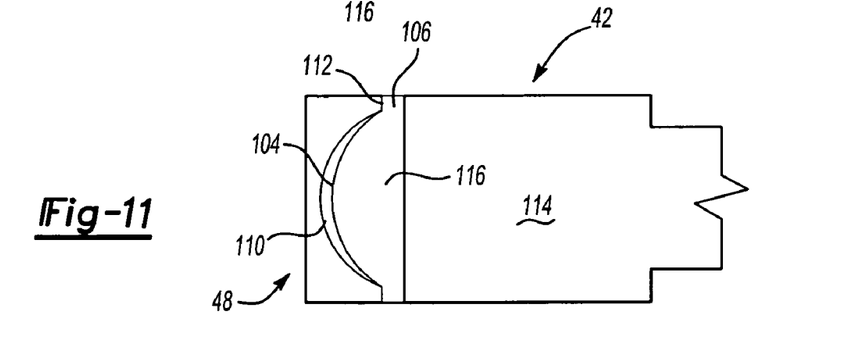
FIG. 11 is a partial end view of the nut feed pawl shown in FIGS. 2, 9 and 10.

FIGS. 9 to 11 illustrate one preferred embodiment of the nut feed pawl 42. As described above, the nut feed pawl 42 is generally conventional except for the configuration of the distal free end 48. As described above, the disclosed embodiment of the nut feed pawl 42 includes an aperture 46 adapted to receive a pivot pin 44 (see FIG. 1) to pivotally support the nut feed pawl 42 in a nut feed passage 30 having a proximal finger 50 which is biased by a return spring 52, urging the nut feed pawl to rotate in a counterclockwise direction to receive the distal free end 48 in the nut feed groove 92 and the counterbore 100 upon opening of the die press (not shown). Thus, a conventional nut feed pawl may be easily replaced by the nut feed pawl 42 of this invention by removing the pivot pin 44 and replacing the conventional nut feed pawl with the nut feed pawl 42 of this invention with minor modifications to account for the preferred angle of inclination of the feed pawl 42 of this embodiment. Further, the nut feed pawl 42 of this invention does not have a significantly greater cost.

As best shown in FIG. 11, the distal free end of the end portion 48 of the nut feed pawl 42 includes a generally semicircular central end portion 104 and radial portions 106. The driving face of the distal free end 48 of the feed pawl 42 includes a cylindrical surface 108 which blends into the generally semicircular end portion 104 in an arcuate chamfer 110, as shown in FIGS. 10 and 11, and the radial portions 106 include planar driving surfaces 112 as best shown in FIGS. 9 and 11. As best shown in FIG. 11, the cylindrical surface 110 defines an arc of less than 180 degrees, preferably less than 150 degrees, or about 120 degrees, and the radial portions 106 extend from the cylindrical surface 108. The back face 114 is preferably inclined from the end face 116 at an angle of between 20 and 60 degrees and may include an arcuate surface 118 as shown in FIG. 10 which blends the inclined back face 114 into the end face 116. The reciprocable nut feed pawl 42 is preferably formed of tool steel to reduce wear and the upper portion 120 may have a smaller width to reduce cost. As set forth above, the distal free end 48 of the nut feed pawl 42 is configured to be received in the nut feed grooves 92 and the counterbore 100 in the end face 82 of the nut 32 without contacting the nut bore 64 as now described.

Figure 3:
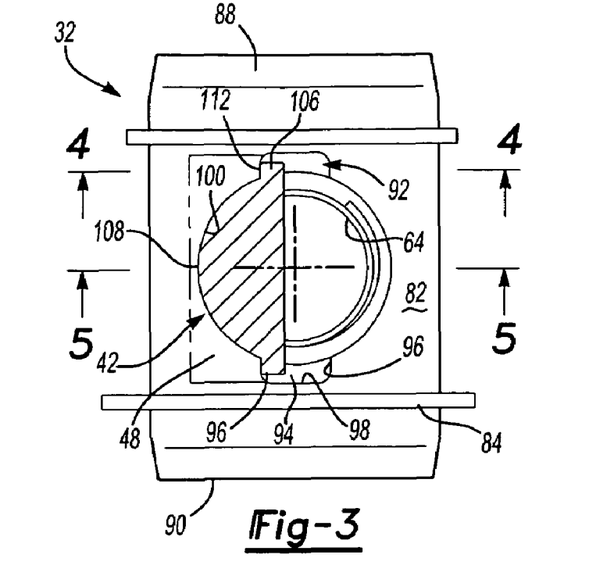
FIG. 3 is a top view of the nut configuration shown in FIG. 1 prior to receipt of frangible wires in the linear wire grooves with a cross-sectional view of the end portion of the nut feed pawl.
Figure 4:
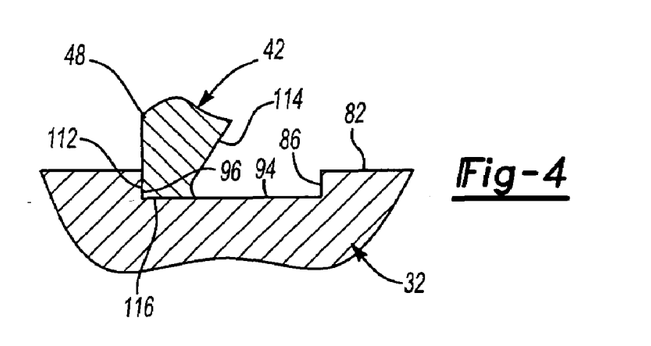
FIG. 4 is a partial cross-sectional view of FIG. 3 in the direction of view arrows 4—4.

As best shown in FIGS. 3 to 5, the central cylindrical portion 108 of the distal free end 48 of the nut feed pawl 42 is received in the cylindrical counterbore 100 and the radial portions 106 are received in the nut feed grooves 92, such that the planer end faces 112 engage the leading side wall 96 as the distal end 48 of the feed pawl is biased in a counterclockwise direction by the return spring 32 (FIG. 1) upon opening of the die press. The diameter of the cylindrical surface 108 is generally equal to the internal diameter of the cylindrical counterbore 100 or slightly less to prevent binding. The radial portions 106 are generally rectangular as shown in FIG. 3 having a width substantially less than the width of the nut feed grooves 92 measured between the side walls 96 as best shown in FIGS. 3 and 4. The arcuate chamfered surface 110 prevents binding of the cylindrical surface 108 in the cylindrical counterbore 100 as the distal free end 48 of the nut feed pawl is received and retracted from the nut feed groove 92 and the counterbore 100 during each stroke of the die press (not shown). The feeding force is thus balanced between the planar drive faces 112 of the radial portions 106 of the nut feed pawl 42 and the cylindrical portion 108 while avoiding any contact with the nut bore 64. As will now be understood, the counterbore 96 in the end face 82 is thus preferably cylindrical to receive the cylindrical surface 108 adjacent the free end 116 of the nut feed pawl and the side walls 96 preferably extend perpendicular to the end face 82 in this embodiment to provide balanced feeding of the nuts 32 through the nut feed passage 30.

Figure 2:
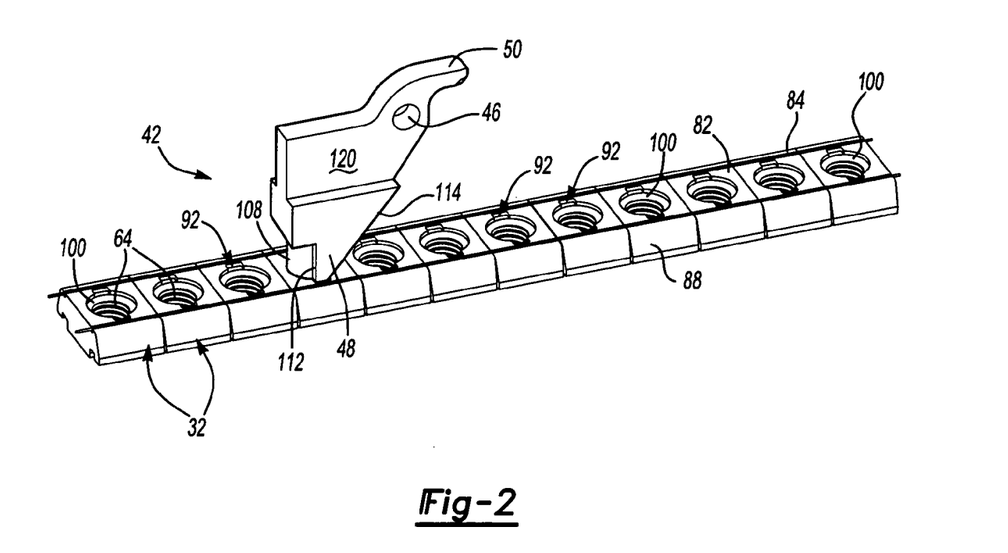
FIG. 2 is a top perspective view of one embodiment of the nut feed pawl and nut configuration of this invention.

The method of feeding nuts through a nut feed passage will now be understood from the above description of one preferred embodiment of the distal free end 48 of the nut feed pawl 42 and the preferred configuration of the nut feed groove 92 and counterbore 100. The method of feeding nuts through a feed passage of this invention includes forming a nut feed groove 92 in the end face 82 of the nut, locating a free distal end portion 48 of a reciprocable nut feed pawl 42 in the nut feed groove 92 and reciprocating the nut feed pawl 42 to feed a nut through the nut feed passage 30 as shown in FIGS. 1 and 2. A preferred embodiment of the method of this invention includes forming the nut feed groove 92 through the axis of the nut bore 64, forming separate nut feed grooves on opposed sides of the nut bore 64, wherein each nut feed groove has an open inner end opening into the nut bore 64. In a most preferred embodiment, the method of this invention includes forming channel-shaped grooves 92 in the end face 82 of the nut 32, each having a bottom wall 94 and opposed side walls 96 which preferably extend perpendicular to the end face 82 of the nut 32 and the nut feed pawl 42 includes radial portions 106, each having a planar drive face 112 engaging the planar side walls 96 of the channel-shaped grooves 92. Where the end face 82 of the nut includes a counterbore 100, the method of this invention preferably includes forming a cylindrical counterbore in the end face 82 of the nut coaxially aligned with the bore 64 having a diameter greater than the bore 64 and the method of this invention preferably includes forming a cylindrical surface 108 on the distal free end 48 of the nut feed pawl 42 and receiving the central cylindrical surface 108 into the cylindrical bore 100 in the end face 82 of the nut 32. The method of this invention then includes reciprocating the nut feed pawl 42 through the nut feed passage 30 to feed a nut 32 through the nut feed passage 30.

As will now be understood from the description of a preferred embodiment of the nut feed system of this invention, the nut feed system of this invention, including the nut feed pawl 42 and the nuts 32, may be utilized to feed any configuration of nuts through a feed passage for any purpose, including but not limited to secondary operations, such as tapping and threading of the nut bore or interconnecting the nuts in a continuous strip, and feeding the nuts through a nut feed passage into an installation head, such as the pierce or clinch nut head 20, disclosed in FIG. 1 and described above and weld nuts into a nut welding apparatus. Thus, the nut feed system and method of this invention is not limited to self-attaching nuts, such as pierce, clinch or weld nuts, but may be utilized in any application requiring feeding of the nuts through a nut feed passage where a reciprocable nut feed pawl drives the nuts through the nut feed passage. Although it has been found that the combination of a nut feed pawl having a semicircular or cylindrical end portion received in a counterbore and radial portions received in nut feed grooves extending through the axis of the bore provides advantages over a nut feed groove alone, including a balanced force, as described above, a nut feed groove extending generally perpendicular to the axis of the bore, but not extending through the axis of the bore may also be utilized, wherein the distal free end of the nut feed pawl includes a drive face received in the nut feed groove may also be utilized, provided the free end of the nut feed pawl does not engage and drive against the nut bore. The nut feed system and method of this invention thus provides an important advantage over the prior art, eliminating damage or distortion of the nut bore cylinder and fulfills a long felt need in this art.

The invention claimed is:

1. A nut, including a body portion having an end face, a bore extending through said body portion through said end face, linear wire grooves in said end face on opposed sides of said bore adapted to receive frangible wires to interconnect a plurality of nuts in a continuous strip, and channel-shaped nut feed grooves in said end face extending perpendicular to said wire grooves on opposed sides of said bore, communicating with said bore and extending generally perpendicular to an axis of said bore adapted to receive a feed pawl for feeding said nuts through a nut feed passage without engaging said bore.

2. The nut as defined in claim 1, wherein said channel-shaped grooves extend perpendicular to said bore through an axis of said bore, each having an open inner end opening into said bore.

3. The nut as defined in claim 1, wherein said channel-shaped grooves each include a bottom wall and opposed side walls extending generally perpendicular to said end face.

4. The nut as defined in claim 1, wherein said end face of said nut further includes a counterbore coaxially aligned with said bore having an inner diameter greater than an inner diameter greater than said bore.

5. The nut as defined in claim 4, wherein said counterbore has a smooth cylindrical outer surface.

6. The nut as defined in claim 1, wherein said bore is internally threaded.

7. A nut including a body portion having an end face, a bore extending through said body portion and said end face, and said end face including a nut feed groove extending generally perpendicular to an axis of said bore and a cylindrical counterbore coaxially aligned with said bore through said end face having an internal diameter greater than said bore, linear wire grooves in said end face on opposed sides of said feed grooves extending perpendicular to said feed grooves adapted to receive frangible elements to interconnect a plurality of said nuts in a continuous strip, said nut feed groove and said counterbore adapted to receive an end portion of a reciprocable feed pawl having a cylindrical outer surface adapted to be received in said cylindrical counterbore and a radial surface adapted to be received in said feed groove for feeding said nut through a nut feed passage without engaging said bore.

8. The nut as defined in claim 7, wherein said nut feed grooves extend through an axis of said bore forming nut feed grooves on opposed sides of said bore each having an open inner end opening into said counterbore.

9. The nut as defined in claim 7, wherein said groove is channel-shaped having a bottom wall and opposed side walls.

10. The nut as defined in claim 9, wherein said side walls extend generally perpendicular to said end face.

11. The nut as defined in claim 7, wherein said counterbore has a smooth cylindrical inner surface.

12. A nut comprising a rectangular body portion including a rectangular pilot portion extending from one face of said body portion, parallel panel retention grooves in said one face on opposed sides of said pilot portion and a rectangular end face opposite said pilot portion, a bore extending through said body portion through said rectangular end face, and said end face including a cylindrical counterbore coaxially aligned with said bore having an internal diameter greater than an internal diameter of said bore and linear nut feed grooves on opposed sides of said cylindrical counterbore extending through an axis of said bore each having an open inner end opening into said cylindrical counterbore, said cylindrical counterbore and said linear nut feed grooves adapted to receive an end portion of a reciprocable feed pawl having a cylindrical surface adapted to be received in said cylindrical counterbore and radial surfaces adapted to be received in said linear nut feed grooves for feeding said nut through a nut feed passage without engaging said bore.

13. The nut as defined in claim 12, wherein said bore is internally threaded.

14. The nut as defined in claim 12, wherein said nut feed grooves are channel-shaped each having a planar bottom wall parallel to said end face and opposed side walls.

15. The nut as defined in claim 14, wherein said side walls extend generally perpendicular to said end face.

16. The nut as defined in claim 12, wherein said end face of said nut includes linear wire grooves on opposed sides of said nut feed grooves extending perpendicular to said nut feed grooves adapted to receive frangible wires to interconnect a plurality of said nuts in a continuous strip.

17. A self-attaching nut for permanent attachment to a panel, comprising:

a rectangular body portion having a planar rectangular end face, a central rectangular pilot portion projecting from a face of said body portion opposite said planar rectangular end face and panel retention grooves on opposed sides of said pilot portion;

a bore defining an axis and extending through said body portion and said end face;

a cylindrical counterbore extending through said end face coaxially aligned with said bore; and opposing feed grooves disposed in said end face on generally opposite sides of said cylindrical counterbore extending outwardly from said counterbore in a direction generally perpendicular to said axis defined by said bore adapted to receive an end of a feed pawl having driving surfaces cooperable with said counterbore and said feed grooves for feeding said nuts through a nut feed passage of an installation tool without engaging said bore.

18. The self-attaching nut defined in claim 17, wherein said feed grooves define a channel shape opening into said cylindrical counterbore.

* * * * *